Nov. 26, 1957 — C. E. ADAMS ET AL — 2,814,182
APPARATUS FOR OPERATING A MACHINE ELEMENT
Filed Nov. 17, 1954 — 5 Sheets-Sheet 1

INVENTORS
CECIL E. ADAMS
WILLIAM E. ESCHLIMAN
BY Herschel C. Omohundro
Attorney

Nov. 26, 1957 C. E. ADAMS ET AL 2,814,182
APPARATUS FOR OPERATING A MACHINE ELEMENT
Filed Nov. 17, 1954 5 Sheets-Sheet 4

INVENTORS
CECIL E. ADAMS
BY WILLIAM E. ESCHLIMAN
Herschel C. Omohundro
Attorney

Nov. 26, 1957   C. E. ADAMS ET AL   2,814,182
APPARATUS FOR OPERATING A MACHINE ELEMENT
Filed Nov. 17, 1954   5 Sheets-Sheet 5

INVENTORS
CECIL E. ADAMS
BY WILLIAM E. ESCHLIMAN

Herschel C. Omohundro
Attorney

United States Patent Office 2,814,182
Patented Nov. 26, 1957

2,814,182

APPARATUS FOR OPERATING A MACHINE ELEMENT

Cecil E. Adams and William E. Eschliman, Columbus, Ohio, assignors, by mesne assignments, to American Brake Shoe Company, New York, N. Y., a corporation of Delaware Application November 17, 1954, Serial No. 469,384

14 Claims. (Cl. 60—52)

This invention relates generally to machinery and is more particularly directed to apparatus for operating a machine element either of the type adapted to directly perform useful work or to control another mechanism which in turn performs the useful work.

One of the objects of this invention is to provide an apparatus which may be preset to cause a machine or an element thereof to perform a desired cycle of operations and to automatically repeat such cycle until interrupted.

Another object of this invention is to provide an apparatus having a motor driven cam and means for governing the operation of the motor to secure the results of a variable or adjustable cam or even different cams and yet make use of a cam of predetermined, inflexible design, the apparatus being suitable for actuating a tool which works directly on a product or on the control element of another machine which works on the product.

A further object of the invention is to provide an apparatus having a cam of predetermined inflexible design and motor means for driving the cam through one or more cycles of operaton, means being provided to govern the flow of motivating energy to the motor to cause it to drive the cam according to a predetermined cycle pattern, the last named means being preset and operated by the motor which is in turn controlled thereby, the governing means being adjustable to vary the cycle pattern as desired.

This invention is particularly adaptable to hydraulically operated apparatus and to control mechanisms for hydraulic apparatus such as a fluid motor of the piston and cylinder type, such motors frequently being employed in hydraulic presses.

A further object of the invention is to provide control mechanism which may be set to cause a hydraulic motor to perform a predetermined cycle of operation. For example, it is frequently desired to have the ram of a press perform one or more cycles of operation in which it will move during a portion of its advancing stroke at one rate, perform a pressing operation at another rate and return to the initial starting position at still another rate. In some instances it may be desirable to have the press ram perform additional operations or travel at still different rates during certain portions of its cycle of operation.

An object also of this invention is to provide mechanism by which the desired cycle of operation may be pre-set and the press caused to continue the same cycle of operation automatically until the operator wishes to have the press operations interrupted.

Another object of the invention is to provide a novel hydraulic system for causing the operation of a press, this system including a valve mechanism between the means in the system for generating hydraulic pressure and the press or power cylinder thereof, a novel means being provided also to effect the operation of the valve means, the valve actuating mechanism including a motor, a cyclical motion transmitting means between the motor and the valve and means which may be previously set for controlling the operation of the motor.

A still further object of the invention is to provide a hydraulic cylinder and ram, a control valve therefor and operating means for such valve, the operating means including a fluid motor, a cam, a motion transmitting means between the cam and a movable element of the control valve and a second control means for the fluid motor, such second control means being controlled in turn by the motor and having elements which may be pre-set for controlling fluid flow to the motor, these elements being rendered effective successively by the operation of the fluid motor.

A more specific object of the invention is to provide hydraulic apparatus having a fluid pressure source, a power cylinder with a ram, a control valve mechanism between the power cylinder and the pressure source and actuating means for the control valve mechanism, such actuating means having a heart-shaped or uniform motion cam, a fluid motor for effecting the rotation of the uniform motion cam and a second control means for the fluid motor, such second control means including a plurality of adjustable orifices and a rotary valve for successively rendering the orifices effective to control the flow of operating fluid to the fluid motor, the rotary valve being in turn driven by the fluid motor, the operation of which it controls.

Another object is to provide the control mechanism set forth in the preceding paragraph with a valve for causing the control mechanism to operate a single time or to repeat the operations automatically.

Another object of the invention is to provide the control valve mechanism for the power cylinder with means to prevent the over control of the power cylinder, that is, a safety means which will by-pass a portion of the motivating energy for the motor in the master control in the event the master control mechanism tends to require operations in excess of the capacity of the power cylinder or other apparatus being controlled.

Further objects and advantages of the present invention will be apparent from the following description, reference being had to the accompanying drawings wherein a preferred form of embodiment of the invention is clearly shown.

Figure 1:
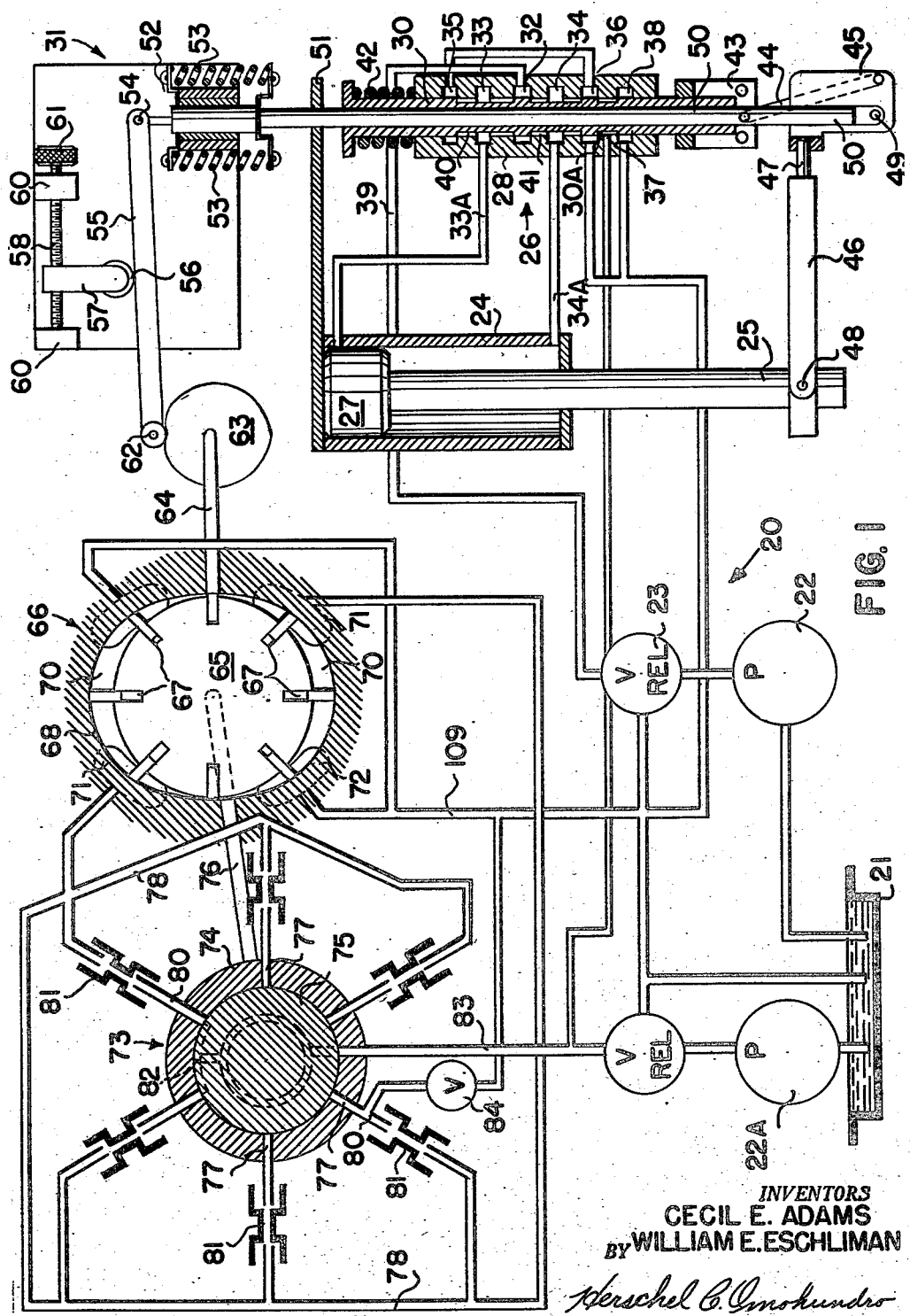
Fig. 1 is a diagrammatic view of a hydraulic system embodying the present invention.

As pointed out in the objects, the invention is directed broadly to apparatus for operating a machine element, either one that directly performs operations on an end product or one that actuates the controls of a mechanism which in turn performs operations on an end product. Fig. 1 shows the invention in the latter form, the operating mechanism being combined with and controlling the operation of hydraulic apparatus having a hydraulic system designated generally by the numeral 20. The hydraulic system 20 includes a reservoir 21, a power driven pump 22, a relief valve 23 and a reversible fluid motor of the piston and cylinder type 24, such a motor generally being employed in a hydraulic press to effect the reciprocation of a ram 25. While in the following description reference may be frequently made to a hydraulic press or ram, these references are by way of example only and are not intended as a limitation, the invention being applicable to motors for securing either linear or rotary motion. The hydraulic system includes a plurality of conduits through which fluid delivered by the pump is conducted to points of use and returned to the reservoir 21 as is usual in hydraulic systems. The system also includes a control valve mechanism, designated generally by the numeral 26, for governing the operation of the motor 24, the mechanism 26 in this illustration being of a specific type, namely, a follow-up valve mechanism for securing a closer control of the action of the piston 27 of motor 24 and the ram 25 operated thereby.

As mentioned in the objects, the invention is directed to means for operating a machine element or for controlling the operation of the motor which controlling operation is accomplished in the adaptation of the invention shown in Fig. 1 by the actuation, in a preselected manner, of the control valve mechanism 26. The latter mechanism includes a valve casing 28, a valve element 30 movable in said casing and an actuating means, designated generally by the numeral 31, for imparting movement to the movable valve element. More specifically the casing 28 of the control valve mechanism 26 has a bore for movably receiving the valve element 30, a plurality of ports 32 to 38, inclusive, being spaced longitudinally of and communicating with the bore. The first port 32 is connected by a conduit 39 with the outlet of the pump 22 in which the relief valve 23 is connected. Fluid issuing from the pump 22 will flow through the valve 23 and conduit 39 to the inlet port 32 of the valve mechanism. Ports 33 and 34 may be termed motor ports and, in the hydraulic system illustrated, they are connected by conduits 33A and 34A with the upper and lower ends of the cylinder of motor 24. Fluid supplied to the motor cylinder through these conduits causes the reciprocation of the piston 27 and ram 25.

The movable element 30, hereinafter termed the valve spool, is provided with a plurality of grooves 30A, 40 and 41 for establishing communication between certain sets of the ports 32 to 38, inclusive, depending upon the position of the spool 30 in the casing 28. The spool is urged in one direction in the casing by a coil spring 42 arranged between one end wall of the casing and a flange on the spool. At the opposite end of the casing, the spool is provided with a block 43 which is clamped or otherwise secured thereto and is connected by one or more links 44 with a second block 45, this block being in turn connected by an arm 46, having a sliding joint 47, with the ram 25; the connection between the arm and the ram is a pivoted one, as indicated at 48. The block 45 is also pivotally connected, as at 49, to the lower end of a rod 50 disposed for sliding movement in the spool 30, the rod projecting upwardly through the spool and suitable guide mechanism 51 carried by the power cylinder 24.

The control mechanism 31 has a support 52 in which the upper end of the rod 50 is also guided for movement, a pair of tension springs 53 being suitably connected with the support 52 and the rod 50 and operative to urge the rod in an upward direction. The upper terminus of the rod 50 is pivotally connected as at 54, with a lever 55 disposed for rocking movement about a roller 56 which is mounted for adjustment on the support 52. Any suitable mechanism may be provided for mounting the roller 56 but, for purposes of illustration, it is shown as being carried by a block 57 guided for horizontal movement on the support 52, the block being moved by an adjusting screw 58 supported for rotation in lugs 60 projecting from the support 52. The screw 58 has an adjusting knob 61 at one end so that it may be conveniently turned and the reaction thereof with the block 57 will cause the latter to move horizontally to shift the point of contact of the roller 56 with the lever 55. This action results in varying the pivoting moments of the arms of the lever at opposite sides of the roller 56. Such an adjustment will vary the throw of the lever at the pivot 54 and consequently the amount of movement transmitted by the rod 50 to the valve element or spool 30.

The lever 55 at the end opposite that connected to the rod 50 is provided with a follower roller 62 which engages and is moved by the surface of a cam 63, the cam in this instance being a heart-shaped cam to effect the desired movement of the valve spool on the part of the valve spool. Heart-shaped cams are well known for producing uniform motion. Cam 63 has been given this shape for such purpose. Cam 63 is connected for rotation with a shaft 64 which is arranged to be driven by the rotor 65 of a fluid motor 66 shown diagrammatically in Fig. 1.

The motor 66 is illustrated as a balanced vane type motor, rotor 65 thereof being provided with spaced radially extending vanes 67 for engagement with an elliptical cam surface 68. The elliptical cam surface cooperates with the round rotor to provide diametrically opposed working sections 70, each having inlet and outlet ports 71 and 72, respectively, communicating with opposite ends thereof. The vane elements, in cooperation with the rotor and pump casing walls, provide fluid transfer pockets which communicate with the inlet and outlet ports as the rotor 65 revolves. Fluid admitted to the inlet ports 71 exerts a pressure on one side of the vanes and causes the rotor 65 to revolve carrying the fluid to the outlet ports 72. Fluid is supplied to the motor 66 from a pump 22A, this fluid passing through a rotary valve indicated generally by the numeral 73.

The valve is shown diagrammatically in Fig. 1 as including a stationary element 74 and a rotatable element 75 which is connected for operation by the motor 66 through an extension 76 of the shaft 64. The element 74 has a plurality of ports 77, in this instance being six in number, which are connected with a manifold 78 by a plurality of passages 80. Each passage 80 contains a variable orifice 81 for controlling the volume of fluid permitted to flow from the port 77 to the manifold 78. Fluid is admitted to the ports 77 through an elongated port 82 formed in the movable valve element 75, port 82 being in communication with a passage 83 leading from the pump 22A. It will be apparaent from the diagrammatic illustration in Fig. 1 that fluid flowing through the passage 83 to the port 82 will flow through one or more of the ports 77 and through the conduit or conduits 80 connected with the ports 77 to the manifold 78 and from this manifold to the inlet ports 71. Such fluid will flow from the ports 71 into the fluid transfer pockets registering with such ports and exert force on the vanes forming these pockets. This force will cause the rotor 65 to revolve, this rotary motion being transmitted by the shaft extension 76 to the valve element 75. Since port 82 is carried by this valve element, it will move and successively register with the ports 77. Port 82 is of a length sufficient to communicate at least partially with two adjacent ports 77 so that some fluid will be admitted at all times to the inlet port 71. The motor 66 will, therefore, be prevented from stalling.

It will be obvious that, when port 82 communicates with any one of ports 77 in the stationary valve element, the setting of the variable orifice in the passage 80 communicating with such port will determine the speed of operation of the motor 66. Since the rotor 65 of this motor is also connected by shaft 64 with the came 63, the speed of operation of the cam will conform to the speed of operation of the motor. As the speed of operation of the cam changes, the speed of movement of the lever 55 will also change, this change being transmitted through rod 50 and the connections thereof to the spool 30. Since the valve mechanism 26 is of the follow-type, a change in speed of movement of its valve spool 30 will in turn be transmitted to the motor 24, or the piston thereof, the ram 25 moving in unison with this piston. As the cam 63 is symmetrical on opposite sides of a plane passing through the high and low points of the cam, the lever 55 will be operated in two directions upon each revolution of the cam 63. When the lever is operated in one direction, that is, through the first half of a revolution of the cam 63, fluid will be admitted to the power cylinder 24 by the valve mechanism 26 to cause the piston and ram to advance. On the second half of the revolution of the cam 63, the ram and piston will be caused to retract. Since six ports 77 are provided and these ports are equally spaced around the valve element 75, three of the orifices 81 will control the downward movement of the piston 27, the remaining three controlling the upward movement thereof. Each orifice may be set to cause the rotor 65 to revolve through the portion of the cycle controlled thereby at a different rate and the piston 27 of the power cylinder will move at a corresponding rate.

As suggested previously, the mechanism including the motor 66, rotary valve 73 and cam 63 may be employed to actuate a member which operates directly on an end product. For example, a ram or other suitable machine element may be directly actuated by the cam 63 or by the lever 55.

It will be obvious from the foregoing that different patterns of operation of a ram or other actuated element may be controlled with the mechanism disclosed herein. It will also be obvious that desired patterns of operation may be previously set and these operations will be performed repeatedly, that is, for each cycle of operation as long as the rotor 65 of the motor 66 is revolved.

One of the features mentioned previously is to prevent the overcontrol of the apparatus being governed, in this instance the motor 24. This feature is secured by providing the control valve mechanism 26 with means to bypass a variable portion of the energizing medium for motor 66. In the valve mechanism 26, the casing ports 36 and 38 communicate with the reservoir and are disposed on either side of the port 37 which communicates with conductor 83 leading from pump 22A. When the valve spool 30 is moved in either direction from the "off" position, a groove 30A in the spool will establish communication between port 37 and port 36 or 38 permitting some of the fluid delivered by the pump 22A to be by-passed directly back to the reservoir. If the valve spool 30 should tend to move an excessive amount, the degree of communication between port 37 and port 36 or 38 will increase causing more fluid to be by-passed thus reducing the amount available for the operation of motor 66. In this manner, the slave valve 26 in turn partially controls the master or actuating means.

It is one of the objects of this invention to cause the mechanism to perform a single cycle of operation. A valve 84 has been provided for this purpose. This valve is connected with one of the passages 80 between the stationary element 74 of the rotary valve 73 and the orifice 81 in the selected passage. If, after port 82 has passed port 77 connected with the particular passage selected, valve 84 is opened, fluid subsequently admitted to the passage will be permitted to flow through the valve 84 and passage connected therewith to the reservoir 21 and motor 66 will then cease operation. To effect subsequent operation of motor 66, it will be necessary to close valve 84.

Figs. 2 to 8, inclusive, illustrate details of the mechanism 31 for actuating the valve mechanism 26. As mentioned above, the actuating mechanism 31 includes a fluid motor 66 having a casing 86 in which a chamber 87 for the rotor 65 is provided. This rotor is connected with the shaft 64 which is supported for rotation in the casing 86 by ball or other suitable anti-friction bearings 88. One end of the shaft 64 projects from the casing and is formed for the reception of the cam 63. The casing 86 includes a section 89 in which the elliptical cam surface 68 is formed. This elliptical cam surface cooperates with the rotor 65, as previously mentioned, to form the working sections 70 of the motor. It also causes the vanes 67 to move radially into and out of the rotor. In this instance, certain parts of the motor 66 function also as parts of the rotary valve 73, the element 74 being formed by the section 90 of the pump casing and the element 75 being formed by the rotor 65. To secure this dual action of these parts, rotor 65 is provided with a port 82 extending completely through the rotor, the latter being formed with a groove 91 on one side for continuous communication with a passage 92 in turn communicating with the inlet conduit 83. As the rotor 65 revolves, groove 91 will be continuously charged with fluid from the pump 22A and fluid will be admitted successively to the ports 77.

Figure 2:
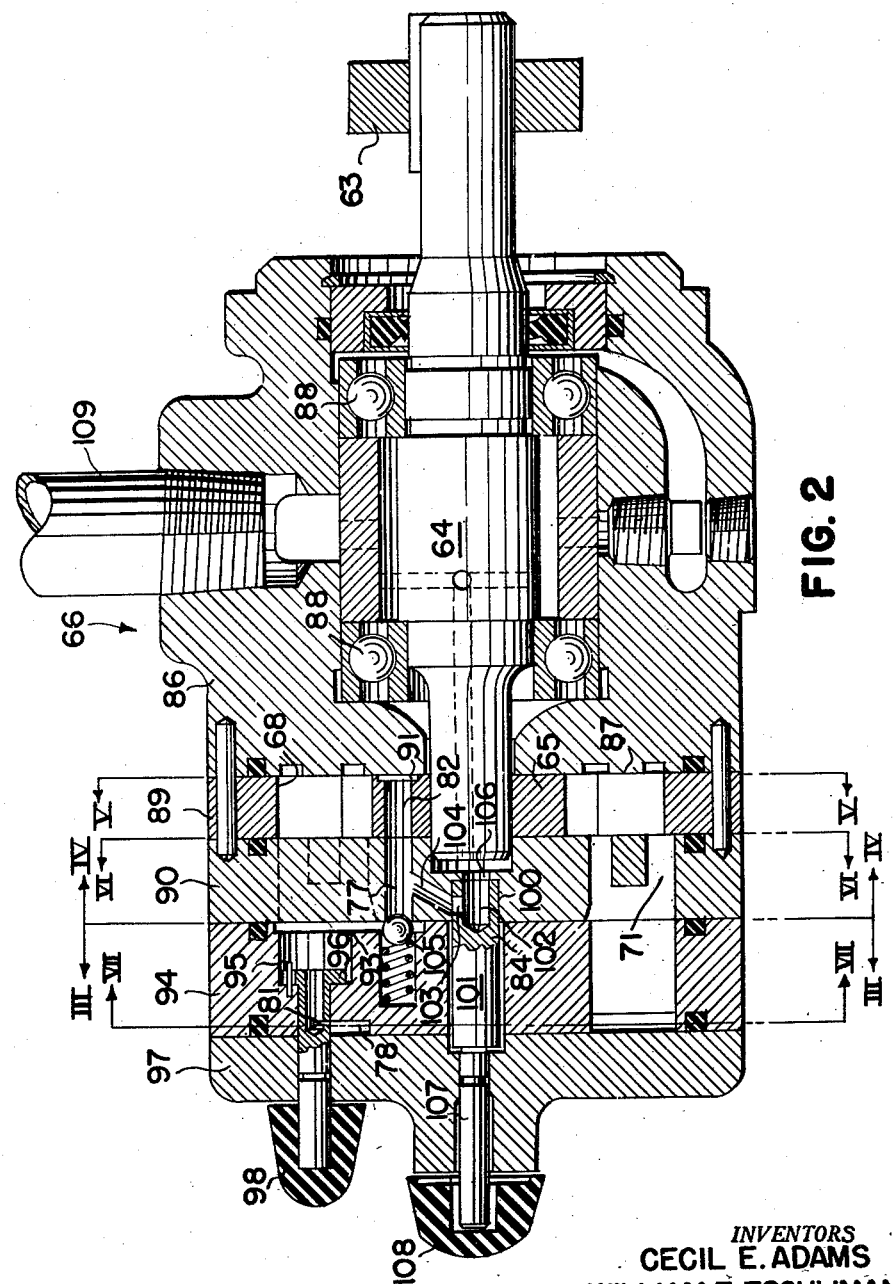
Fig. 2 is a longitudinal sectional view taken through a portion of the control mechanism shown in Fig. 1, this portion including a fluid motor and rotary valve operated thereby, the section being taken on line II—II of Fig. 3.
Figure 3:
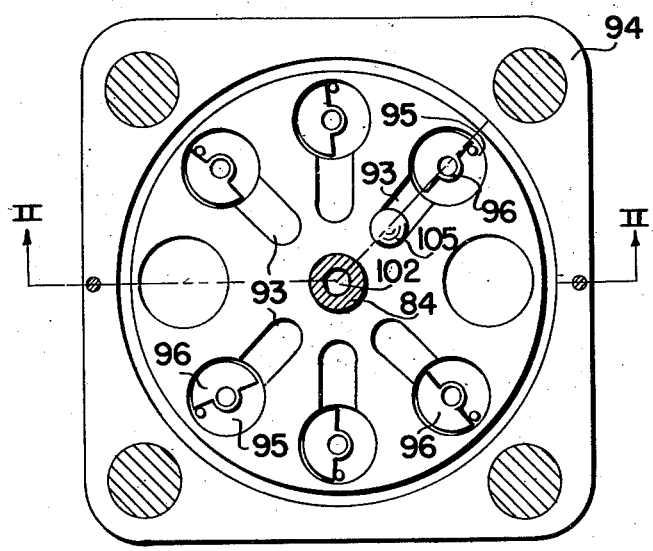
Figs. 3, 4, 5, 6 and 7 are vertical transverse sectional views taken on the planes indicated, respectively, by lines III—III, IV—IV, V—V, VI—VI and VII—VII in Figure 2.
Figure 4:
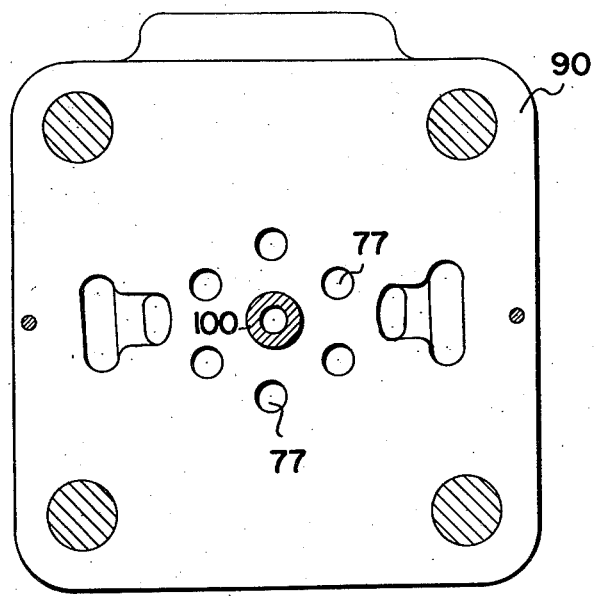
Figure 5:
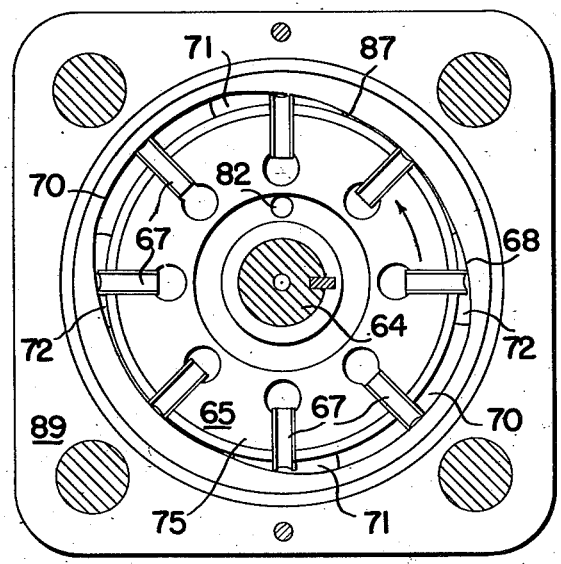
Figure 6:
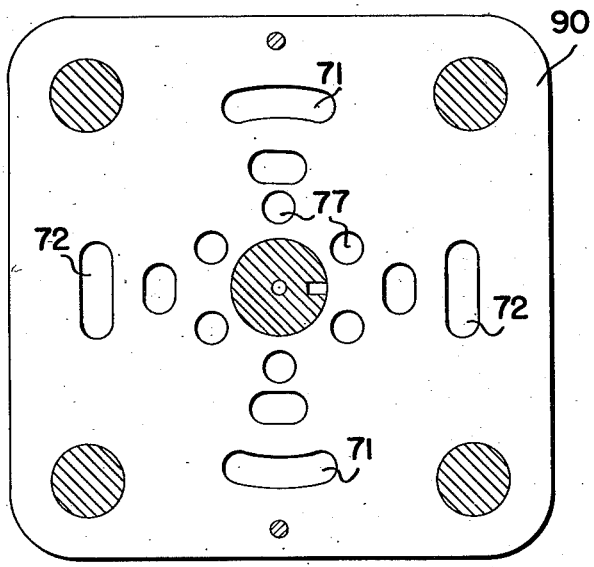
Figure 7:
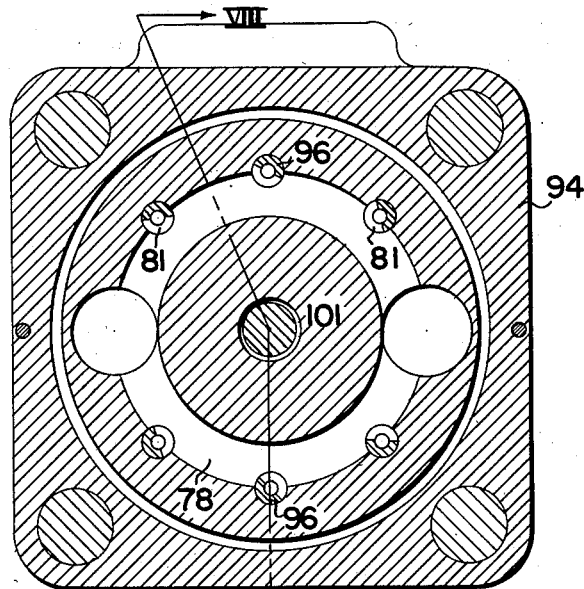
Figure 8:
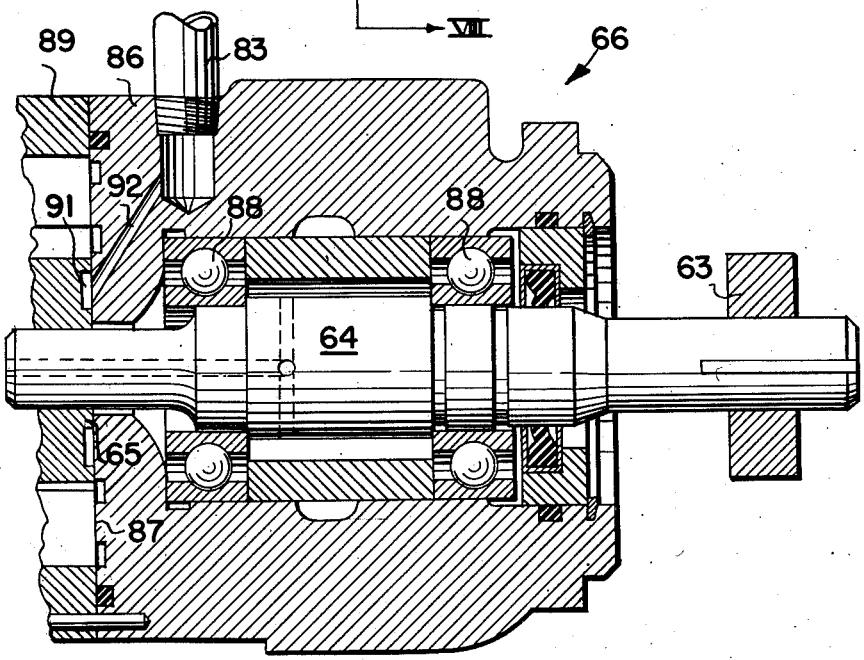
Fig. 8 is a longitudinal sectional view taken on the staggered planes indicated by the line VIII—VIII of Fig. 7.

The ports 77 are formed in section 90 of the casing. This section cooperates with sections 86 and 89 to form the rotor chamber, ports 77 being spaced circumferentially of this chamber as indicated diagrammatically in Fig. 1. Each port 77 at the end opposite that communicating with port 82, communicates with its respective recess 93 formed in the adjacent surface of a section 94 of the casing 86. This section 94 embraces the passages 80, of which recesses 93 form a part, the variable orifices 81 and the manifold 78, the latter being formed by a recess in the surface of the casing section 94 opposite that occupied by the recesses 93. The manifold 78 communicates with the inlet ports 71 as shown in Fig. 2, these inlet ports in turn communicating with the rotor chamber.

Each variable orifice includes a chamber 95 formed in the section 94 and a rotatably adjustable element 96, this element including a shaft which projects through the cap 97 of the casing 86 and is provided with a knob 98 for effecting its adjustment. The element 96 has an opening formed therein and a slot extending transversely through the shaft to intersect the opening. This slot, when the shaft is revolved, cooperates with the side of manifold 78 to form the adjustable orifice 81. It will be obvious that rotation of the knobs 98 will uncover various degrees of the slots in the elements 96 to change the sizes of the orifices 81. These relative sizes of the orifices will determine the volume of fluid permitted from the recesses 93 to the manifold 78.

The valve 84 is formed by providing the section 90 with a recess at 100 for the reception of a plug element 101 having a central bore 102 formed therein and a lateral port 103 extending from this bore. Port 103 is arranged to register with an angularly extending passage 104 drilled in the section 90 and intersecting one of the ports 77. The particular port 77 thus intersected is provided at its outer end with a check valve 105 in the form of a ball which is spring pressed to a closed position. This ball valve prevents reverse flow of fluid to the port 77 and introduces a resistance so that, when valve 84 is open, fluid will flow through this valve 84 rather than to the manifold 78. Fluid flowing through valve 84 passes to an exhaust passage with which bore 102 communicates through a hole 106 formed at the inner end of the recess 100. Hole 106 communicates with a drain passage formed in shaft 64. The interior of the casing is suitably connected with a drain line 109 leading to the reservoir 21. As illustrated in Fig. 1, pump outlet ports 72 are also connected with the line 109. The plug element 101 has an extension 107 which projects through the cap 97 and is provided with an adjusting knob 108 at the outer end thereof. Rotation of this knob moves port 103 into and out of registration with the passage 104. When this registration is interrupted, motor 66 will operate continuously. Single cycle operation is effected, as previously pointed out, through the adjustment of knob 108.

While the form of embodiment of the present invention as herein disclosed constitutes a preferred form, it is to be understood that other forms might be adopted, all coming within the scope of the claims which follow.

We claim:

1. In a hydraulic press, a pump, a piston and cylinder type hydraulic motor; a follow-up valve between said pump and motor connected cause reverse operation of said motor, said follow-up valve including a valve element movable independently of the movable element of said motor to connect said motor and pump and then movable in response to movement of the movable element of said motor to disconnect said motor from said pump; control means for moving said valve element independently of said movable motor element including a rotary hydraulic motor; cam means rotated by said rotary motor; motion transmitting means between said cam means and said valve element including a lever; means forming a movable fulcrum for said lever; control means for controlling the speed of rotation of said rotary motor including a rotary valve driven by said motor; a plurality of independently adjustable orifice means through which hydraulic fluid must pass to reach said rotary motor, said rotary valve connecting said orifice means successively to said rotary motor, and means for diverting hydraulic fluid flowing to said rotary motor when said rotary valve occupies one position.

2. In a hydraulic press, a pump, a piston and cylinder type hydraulic motor; a follow-up valve between said pump and motor connected to cause reverse operation of said motor, said follow-up valve including a valve element movably independently of the movable element of said motor to connect said motor and pump and then movable in response to movement of the movable element of said motor to disconnect said motor from said pump; control means for moving said valve element independently of said movable motor element including a rotary hydraulic motor; cam means rotated by said rotary motor; motion transmitting means between said cam means and said valve element; control means for controlling the speed of rotation of said rotary motor including a rotary valve driven by said motor; a plurality of independently adjustable orifice means through which hydraulic fluid must pass to reach said rotary motor, said rotary valve connecting said orifice means successively to said rotary motor, and means for diverting hydraulic fluid flowing to said rotary motor when said rotary valve occupies one position.

3. In a hydraulic press, a pump, a piston and cylinder type hydraulic motor; a follow-up valve between said pump and motor connected to cause reverse operation of said motor, said follow-up valve including a valve element movable independently of the movable element of said motor to connect said motor and pump and then movable in reponse to movement of the movable element of said motor to disconnect said motor from said pump; control means for moving said valve element independently of said movable motor element including a rotary hydraulic motor; cam means rotated by said rotary motor; motion transmitting means between said cam means and said valve element; control means for controlling the speed of rotation of said rotary motor including a rotary valve driven by said motor, a plurality of independently adjustable orifice means through which hydraulic fluid must pass to reach said rotary motor, said rotary valve connecting said orifice means successively to said rotary motor.

4. In a hydraulic press, a pump, a piston and cylinder type hydraulic motor; a follow-up valve between said pump and motor connected to cause operation of said motor, said follow-up valve including a valve element movable independently of the movable element of said motor to connect said motor and pump and then movable in response to movement of the movable element of said motor to disconnect said motor from said pump; control means for moving said valve element independently of said movable motor element including a rotary hydraulic motor; control means for controlling the speed of rotation of said rotary motor including a rotary valve driven by said motor, and a plurality of orifice means through which hydraulic fluid must pass to reach said rotary motor, said rotary valve connecting said orifice means to said rotary motor successively.

5. In a hydraulic press, a pump; a piston and cylinder type hydraulic motor; a follow-up valve connected to control the flow of fluid from said pump to said motor, said follow-up valve including a valve element movable independently of movement of the movable element of said motor to connect said motor and pump and then movable in response to movement of the movable element of said motor to disconnect said motor from said pump; control means for moving said valve element independently of movement of said movable motor element including a second motor; cam means moved by said second motor; motion transmitting means between said cam means and said valve element including a lever; means forming a movable fulcrum for said lever; control means operated by said second motor for controlling the rate of operation of the latter to follow a predetermined pattern, said control means including a plurality of means for metering the flow of driving medium to said second motor and operating to connect said metering means successively to said second motor, and means for rendering said second motor inoperative when said control means is moved by said motor to one position.

6. In a hydraulic press, a pump; a piston and cylinder type hydraulic motor; a follow-up valve connected to control the flow of fluid from said pump to said motor, said follow-up valve including a valve element movable independently of movement of the movable element of said motor to connect said motor and pump and then movable in response to movement of the movable element of said motor to disconnect said motor from said pump; control means for moving said valve element independently of movement of said movable motor element including a second motor; cam means moved by said second motor; motion transmitting means between said cam means and said valve element; control means operated by said second motor for controlling the rate of operation of the latter to follow a predetermined pattern, said control means including a plurality of means for metering the flow of driving medium to said second motor and operating to connect said metering means successively to said second motor, and means for rendering said second motor inoperative when said control means is moved by said motor to one position.

7. In a hydraulic press, a pump; a piston and cylinder type hydraulic motor; a follow-up valve connected to control the flow of fluid from said pump to said motor, said follow-up valve including a valve element movable independently of movement of the movable element of said motor to connect said motor and pump and then movable in response to movement of the movable element of said motor to disconnect said motor from said pump; control means for moving said valve element independently of movement of said movable motor element including a second motor; cam means moved by said second motor; motion transmitting means between said cam means and said valve element, and control means operated by said second motor for controlling the rate of operation of the latter to follow a predetermined pattern, said control means including a plurality of means for metering the flow of driving medium to said second motor and operating to connect said metering means successively to said second motor.

8. In a hydraulic press, a pump; a piston and cylinder type hydraulic motor; a follow-up valve connected to control the flow of fluid from said pump to said motor, said follow-up valve including a valve element movable independently of movement of the movable element of said motor to connect said motor and pump and then movable in response to movement of the movable element of said motor to disconnect said motor from said pump; control means for moving said valve element independently of movement of said movable motor element including a second motor; means moved by said second motor for moving said valve element independently of movement of the movable element of said first mentioned motor; control means operated by said second motor for controlling the rate of operation of the latter to follow a predetermined pattern, said control means including a plurality of means for metering the flow of driving medium to said second motor and operating to connect said metering means successively to said second motor.

9. In a hydraulic press, a pump; a piston and cylinder type hydraulic motor; a follow-up valve connected to control the flow of fluid from said pump to said motor, said follow-up valve including a valve element movable independently of movement of the movable element of said motor to connect said motor and pump and then movable in response to movement of the movable element of said motor to disconnect said motor from said pump; control means for moving said valve element independently of movement of said movable motor element including a second motor; means moved by said second motor for moving said valve element independently of movement of the movable element of said first mentioned motor; control means operated by said second motor for controlling the rate of operation of the latter to follow a predetermined pattern, said control means including means presettable for increasing and decreasing and vice versa the flow of driving medium to said second motor to cause the latter to follow a predetermined cycle of operation.

10. Control apparatus including a motor to be controlled, said motor including a movable element; means for supplying an energizing medium to said motor for operating it; a follow-up control means connected to control the flow of energizing medium to said motor, said follow-up control means including a member movable independently of movement of the movable element of said motor to connect said supply means to said motor and then movable in response to movement of the movable element of said motor to disconnect said motor from said supply means, control means for moving said movable element independently of movement of said movable motor element including a second motor; cam means moved by said second motor; motion transmitting means between said cam means and said movable element including a lever; means forming a movable fulcrum for said lever; control means operated by said second motor for controlling the rate of operation of the latter to follow a predetermined pattern, said control means including a plurality of means for metering the flow of an energizing medium to said second motor and operating to connect said metering means successively to said second motor, and means for rendering said second motor inoperative when said control means is moved to one position by said motor.

11. Control apparatus including a motor to be controlled, said motor including a movable element; means for supplying an energizing medium to said motor for operating it; a follow-up control means connected to control the flow of energizing medium to said motor, said follow-up control means including a member movable independently of movement of the movable element of said motor to connect said supply means to said motor and then movable in response to movement of the movable element of said motor to disconnect said motor from said supply means, control means for moving said movable element independently of movement of said movable motor element including a second motor; cam means moved by said second motor; motion transmitting means between said cam means and said movable element; control means operated by said second motor for controlling the rate of operation of the latter to follow a predetermined pattern, said control means including a plurality of means for metering the flow of an energizing medium to said second motor and operating to connect said metering means successively to said second motor, and means for rendering said second motor inoperative when said control means is moved to one position by said motor.

12. Control apparatus including a motor to be controlled, said motor including a movable element; means for supplying an energizing medium to said motor for operating it; a follow-up control means connected to control the flow of energizing medium to said motor, said follow-up control means including a member movable independently of movement of the movable element of said motor to connect said supply means to said motor and then movable in response to movement of the movable element of said motor to disconnect said motor from said supply means, control means for moving said movable element independently of movement of said movable motor element including a second motor; cam means moved by said second motor; motion transmitting means between said cam means and said movable element, and control means operated by said second motor for controlling the rate of operation of the latter to follow a predetermined pattern, said control means including a plurality of means for metering the flow of an energizing medium to said second motor and operating to connect said metering means successively to said second motor.

13. Control apparatus including a motor to be controlled, said motor including a movable element; means for supplying an energizing medium to said motor for operating it; a follow-up control means connected to control the flow of energizing medium to said motor, said follow-up control means including a member movable independently of movement of the movable element of said motor to connect said supply means to said motor and then movable in response to movement of the movable element of said motor to disconnect said motor from said supply means, control means for moving said movable element independently of movement of said movable motor element including a second motor; means moved by said control means for moving said movable element independently of movement of said movable element of said first mentioned motor; control means operated by said second motor for controlling the rate of operation of the latter to follow a predetermined pattern, said control means including a plurality of means for metering the flow of energizing medium to said second motor and operating to connect said metering means successively to said second motor.

14. Control apparatus including a motor to be controlled, said motor including a movable element; means for supplying an energizing medium to said motor for operating it; a follow-up control means connected to control the flow of energizing medium to said motor, said follow-up control means including a member movable independently of movement of the movable element of said motor to connect said supply means to said motor and then movable in response to movement of the movable element of said motor to disconnect said motor from said supply means, control means for moving said movable element independently of movement of said movable motor element including a second motor; means moved by said control means for moving said movable element independently of movement of said movable element of said first mentioned motor; control means operated by said second motor for controlling the rate of operation of the latter to follow a predetermined pattern, said control means including means presettable for increasing and decreasing and vice versa the flow of energizing medium to said second motor to cause the latter to follow a predetermined cycle of operation.

References Cited in the file of this patent

UNITED STATES PATENTS

| | | |
|---|---|---|
| 1,562,634 | Grahame | Nov. 24, 1925 |
| 2,079,041 | Ryan et al. | May 4, 1937 |
| 2,640,134 | Doutt | May 26, 1953 |